No. 806,208. PATENTED DEC. 5, 1905.
C. L. TAYLOR.
APPARATUS FOR STRIPPING MOLDS FROM INGOTS.
APPLICATION FILED JAN. 19, 1904.
3 SHEETS—SHEET 2.
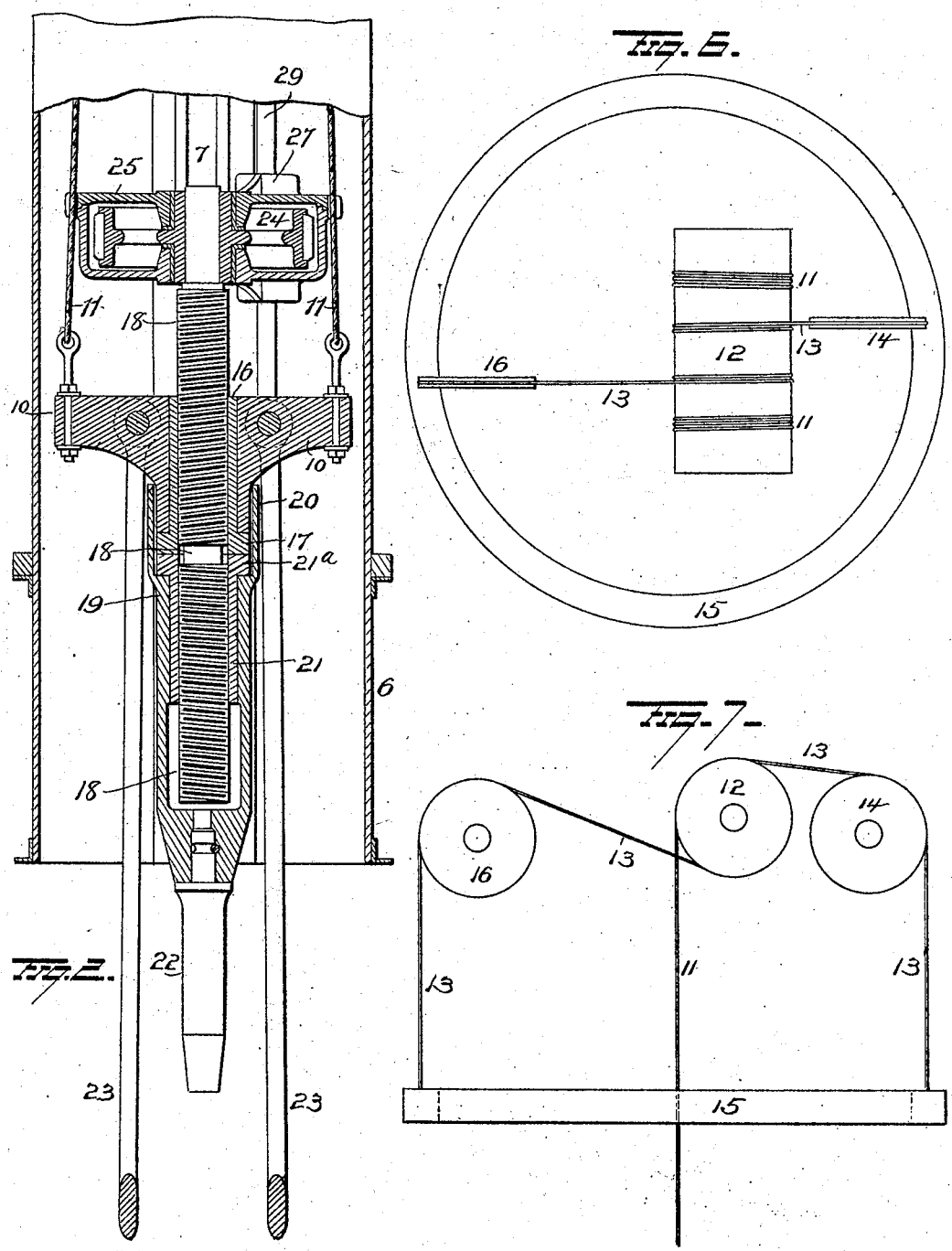

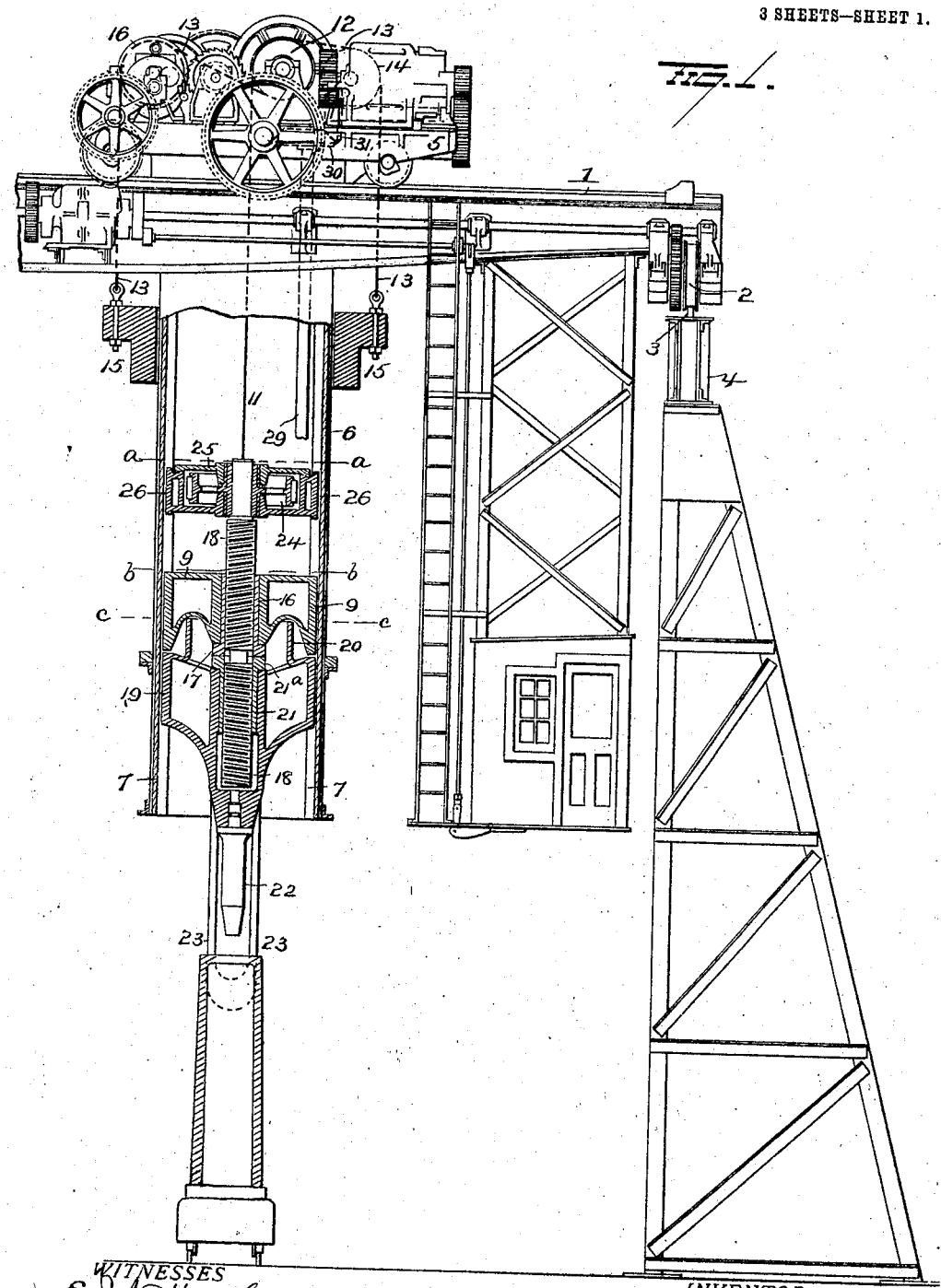

No. 806,208. PATENTED DEC. 5, 1905.
C. L. TAYLOR.
APPARATUS FOR STRIPPING MOLDS FROM INGOTS.
APPLICATION FILED JAN. 19, 1904.
3 SHEETS—SHEET 3.
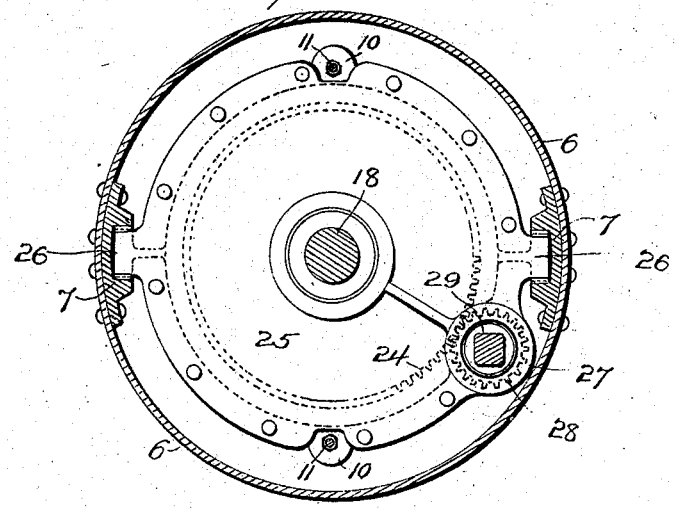
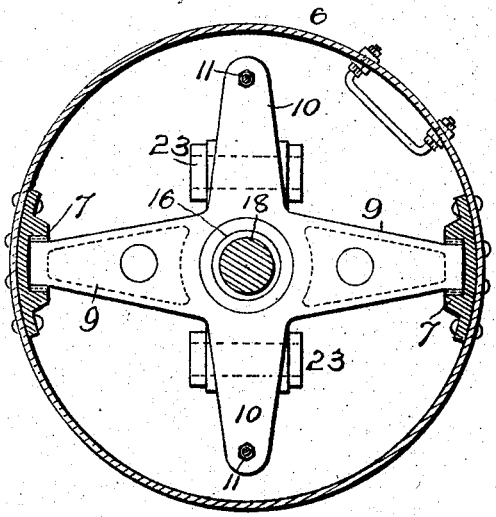
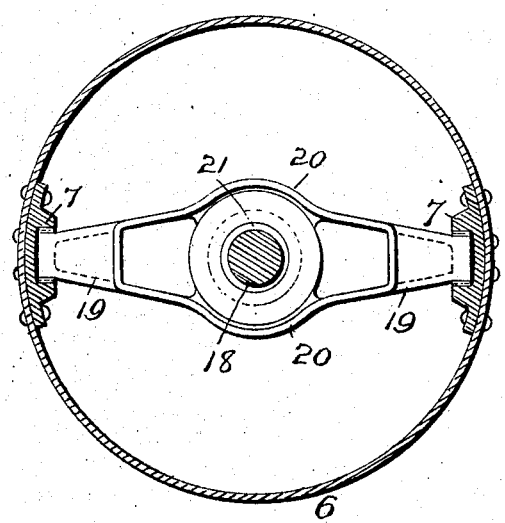
WITNESSES
INVENTOR

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

APPARATUS FOR STRIPPING MOLDS FROM INGOTS.

No. 806,208.        Specification of Letters Patent.        Patented Dec. 5, 1905.

Application filed January 19, 1904. Serial No. 189,711.

*To all whom it may concern:*

Be it known that I, CLARENCE L. TAYLOR, of Alliance, in the county of Stark and State of Ohio, have invented certain new and useful Improvements in Apparatus for Stripping Molds from Ingots; and I do hereby declare the following to be a full, clear, and exact description of the invention, such as will enable others skilled in the art to which it appertains to make and use the same.

My invention relates to an improvement in apparatus for stripping molds from ingots; and it consists, broadly, in a traveling trolley carrying a depending frame and counter-weighted plunger and mold-grasping arms partly contained in and guided by said depending frame.

My invention further consists in the details of construction and combinations of parts, as will be more fully explained, and pointed out in the claims.

In the accompanying drawings, Figure 1 is a view in elevation of a traveling crane and trolley with my improvements applied thereto, the improvements being shown in section. Fig. 2 is a section taken at right angles to that shown in Fig. 1 of the depending frame and stripping apparatus. Fig. 3 is a transverse section on line $a\ a$ of Fig. 1. Fig. 4 is a similar view on the line $b\ b$ of Fig. 1. Fig. 5 is a similar view in the line $c\ c$ of Fig. 1. Fig. 6 is a diagrammatic view showing the hoist-drum and the hoist and counterweight cables, and Fig. 7 is a view in side elevation of the same.

1 represents a traveling bridge provided at its ends with flanged wheels 2, which latter travel on the rails 3 of an elevated or overhead way 4. This bridge is adapted to travel on the elevated track and carries the trolley 5, which latter is designed to travel lengthwise the bridge in the usual and well-known manner. This bridge and its trolley may be and preferably are actuated by electric motors and may be of any approved or well-known forms, as the details of these parts form no part of my present invention.

Depending from the trolley and projecting below and between the bridge-girders is the cylindrical frame 6. This frame is rigidly secured to the trolley-frame and is provided on its inner surface with two guides 7, located at diametrically opposite points.

Located within the frame 6 is the cross-head 9, which rests at its ends in the guides 7 and is provided centrally with the laterally-projecting arms 10 for the attachment of the hoist chains or cables 11. These chains or cables (as clearly shown in Figs. 1, 2, 6, and 7) pass upwardly and are secured at their ends to the hoist-drum 12, which latter is driven by an electric motor in the well-known manner. Hence when this drum is rotated the hoist-cables are wound or unwound, thus raising or lowering, as the case may be, the cross-head 9, which latter carries the stripping mechanism to be hereinafter described.

Secured to the drum 12 are the counterweight-supporting cables or chains 13, one of which passes from the top plane of hoist-drum 12 over pulley 14 to counterweight 15, which embraces frame 6, while the other cable or chain 13 passes from the lower plane of hoist-pulley up over pulley 16 and down to the counterweight, the said cables or chains 13 being so connected to drum 12 with relation to the hoist cables or chains 11 that when the latter wind upon the drum the counterweight-cables unwind, and as the hoist-cables unwind the counterweight-cables wind. By this arrangement the stripping mechanism is always counterbalanced, thus imposing but little work on the hoist-drum except during the operation of stripping a mold from its ingot.

Located centrally in cross-head 9 is the nut 16, having a flanged lower end 17, which bears against the lower end of cross-head 9. This nut is fixed against rotation, and the threads thereof engage the upper threads of the right and left hand screw 18 and carry and support the latter.

Mounted on the lower screw-threaded section of the screw 18 is the cross-head 19, the ends of which rest and move in the guides 7. This cross-head is, as shown in Fig. 1, made hollow and provided with an upwardly-projecting flange 20, which latter surrounds the openings in the upper end face of the cross-head and, as shown in Figs. 1 and 2, overlaps the upper end of nut 16, thus preventing to a large extent any dirt or grit from reaching the screw or nuts, while the hollow cross-head 19 forms a receptacle into which any foreign matter which passes flange 20 may fall or gravitate. This cross-head 19 is also provided with a nut 21, which engages the lower threaded section of the screw 18, and this nut is provided at its upper end with a flange $21^a$, which rests on the upper face of cross-head 19. These nuts 16 and 21 are of course fixed to their respective cross-heads, so that there may be no movement of the nuts independent of the cross-heads. The lower cross-head 19 is hollowed out to receive the lower end of the screw 18 and is provided at a point immediately in line with the screw with a plunger 22, adapted to engage the upper end of the ingot, while the upper cross-head 9 carries the mold-grasping arms 23.

Secured to the upper end of screw 18 is the pinion 24. This pinion is inclosed in a casing 25, which, as shown in Fig. 3, is provided with projections 26, which rest and move in the guides 7, which, as before explained, are secured to the inner face of the depending frame 6. Secured to the casing 25 is the smaller vertical casing 27, carrying a pinion 28, meshing with pinion 24 and mounted on square shaft 29. This square (or angular) shaft depends from the trolley and is provided at its upper end with a miter-gear 30, meshing with a similar gear 31, (see Fig. 1,) driven by a suitable motor and gearing. From the construction thus far explained it will be apparent that when the hoist-drum is rotated the two cross-heads 9 and 19, with their connected parts, will move up or down, the small pinion 28 sliding on the square shaft 29.

In the operation of the apparatus the parts should be lowered by the hoist-chain until the mold-grasping arms 23 are below the ears on the mold and lower end of plunger on or adjacent to the upper end of the ingot. If with the parts in this position and the square shaft 29 be rotated, screw 18 will also be rotated in a direction to raise the upper cross-head and its depending arms 23, and force the lower cross-head 19 and its plunger 22 down onto the ingot. If the top of the ingot be sufficiently cooled to prevent the penetration of the plunger 22, the latter will at once come to a rest and exert on the ingot a pressure equal to the upward pull exerted by the mold-grasping arms 23. If, however, the top of the ingot has not hardened sufficiently to prevent the penetration of the plunger, the latter will move down until it meets with a resistance sufficient to prevent further penetration. When the plunger ceases to move downwardly, the screw 18 then rises in nut 21, thus accelerating the upward movement of the upper cross-head carrying the mold-grasping tongs. In the operation I prefer to lower the plunger until it rests on the ingot before starting the screw, and by so doing I prevent the possibility of lifting the ingot from the car. As soon as the mold is released from the ingot the rotation of the screw is discontinued and the mold lifted off the ingot by the hoist-cable 11 and carried to one side and deposited on another car.

With this device the stripping-screw and its nuts, together with the actuating-pinions, are all located within the depending frame, which not only acts as a rigid support for the parts, but also shields them from the injurious effect of flying dust and grit.

It is evident that many slight changes might be resorted to in the relative arrangement of parts shown and described without departing from the spirit and scope of my invention. Hence I would have it understood that I do not wish to limit myself to the exact construction of parts herein shown and described; but, Having fully described my invention, what I claim as new, and desire to secure by Letters Patent, is—

1. The combination with a trolley, an inclosing frame depending therefrom and a hoist-drum on said trolley, of devices located partly within the inclosing frame for stripping the mold from the ingot, guides secured to said inclosing frame for guiding said stripping devices and a counterweight embracing said inclosing frame, the said stripping devices and counterweight being connected to the hoist-drum by cables or chains.

2. The combination with a trolley, a hoist-drum thereon and a frame depending therefrom, of two cross-heads located within said frame one carrying a plunger and the other mold-stripping arms, means for imparting pressure in opposite directions to said cross-heads, and a flexible device suspending the cross-heads from the drum.

3. The combination with a trolley carrying a drum, and a frame open at its lower end and depending from said trolley, of two cross-heads located within and guided by said frame, mold-stripping devices carried by said cross-heads and a flexible suspending device carried by the drum and connected to one of said cross-heads.

4. The combination with a trolley, a frame depending therefrom and a hoist-drum on the trolley, of a chain or cable carried by said drum, two cross-heads located within and guided by said depending frame, one of said cross-heads being connected to the hoist-cable, mold-grasping arms carried by the upper cross-head, a plunger connected to the lower cross-head and means for moving said cross-heads in opposite directions.

5. The combination with a trolley, a frame depending therefrom and a hoist-drum on the trolley, of a chain or cable carried by said drum, two cross-heads located in and guided by said depending frame, one of said cross-heads being connected to the hoist-cable, mold-grasping arms carried by the upper cross-head, a plunger connected to the lower cross-head, a double screw and nuts for moving the cross-heads toward and away from each other and means for rotating the screw.

6. The combination with a trolley, a frame depending therefrom and a hoist-drum carried thereby, of a stripping apparatus located within said frame, and comprising two cross-heads and a connecting right and left hand screw, one cross-head carrying a plunger and the other mold-grasping arms, a cable or chain connecting said stripping device with the hoist-drum and means for rotating the screw.

7. The combination with a trolley, a frame depending therefrom, and a hoist-drum carried thereby, of a stripping apparatus located within said frame and comprising two cross-heads and a connecting right and left hand screw, one cross-head carrying a plunger and the other, mold-grasping arms, a cable or chain connecting said stripping devices with the hoist-drum, a counterweight also connected to the hoist-drum, and means for rotating the screw.

8. The combination with a trolley and a depending frame, of a stripping device comprising two cross-heads, and a right and left hand screw connecting said cross-heads, a plunger carried by one cross-head, mold-grasping arms carried by the other cross-head, means for suspending said stripping device from the trolley and means for rotating the screw.

9. The combination with a trolley, and an inclosing frame depending therefrom, of stripping devices comprising two cross-heads located within and guided by said depending frame, and a right and left hand screw connecting said cross-head, a plunger carried by one cross-head and mold-grasping arms by the other, a pinion on the upper end of the screw, a casing inclosing said pinion, means for suspending said stripping devices from the trolley and means for rotating the pinion carried by the screw.

In testimony whereof I have signed this specification in the presence of two subscribing witnesses.

CLARENCE L. TAYLOR.

Witnesses:
NORMAN C. FETTERS,
EDGAR E. BROSIUS.